Feb. 21, 1967 E. SORENSEN ET AL Re. 26,160

WATER COOLING SYSTEM

Original Filed Jan. 18, 1960

5 Sheets-Sheet 1

Egon Sorensen
Joseph G. Crost
INVENTORS

BY Clarence A. O'Brien and Harvey B. Jacobson
Attorneys

Egon Sorensen
Joseph G. Crost
INVENTORS
BY Clarence A. O'Brien and Harvey B. Jacobson
Attorneys

WATER COOLING SYSTEM

Original Filed Jan. 18, 1960 5 Sheets-Sheet 3

Egon Sorensen
Joseph G. Crost
INVENTORS

BY Clarence A. O'Brien and Harvey B. Jacobson
Attorneys

WATER COOLING SYSTEM

Original Filed Jan. 18, 1960 5 Sheets-Sheet 4

Egon Sorensen
Joseph G. Crost
INVENTORS
BY Clarence A. O'Brien and Harvey B. Jacobson
Attorneys

WATER COOLING SYSTEM

Original Filed Jan. 18, 1960 5 Sheets-Sheet 5

Egon Sorensen
Joseph G. Crost
INVENTORS
BY Clarence A. O'Brien and Harvey B. Jacobson
Attorneys United States Patent Office Re. 26,160
Reissued Feb. 21, 1967

26,160
WATER COOLING SYSTEM

Egon Sorensen, Willow Grove, Pa., and Joseph G. Crost, Woodstock, N.Y., assignors to Sunroc Corporation, Glen Riddle, Pa., a corporation of Delaware Original No. 3,069,872, dated Dec. 25, 1962, Ser. No. 2,989, Jan. 18, 1960. Application for reissue Dec. 17, 1964, Ser. No. 433,243
13 Claims. (Cl. 62—391)

Matter enclosed in heavy brackets [ ] appears in the original patent but forms no part of this reissue specification; matter printed in italics indicates the additions made by reissue.

This invention comprises a novel and useful water cooling system and more particularly relates to novel features of structure and operation in water cooling systems of the fountain type.

The primary object of the invention is to provide a means for improving the construction, operation and ease of servicing water coolers of the fountain type by the provision of an improved installation therein and an improved construction of a compact cooling unit.

A very important object of the present invention is to provide a water cooler wherein a compact, self contained and unitary cooling unit is provided which may be readily removed from the cabinet, when necessity for servicing arises, and whereby a replacement unit may be substituted therefor with a minimum delay and by relatively inexperienced or unskilled workmen.

A further important object of the invention in accordance with the above objects is to provide a cabinet type of water cooler where a compact cooling component may be readily removed when necessary for servicing whereby the flow of water through the fountain of the cabinet of the fountain may be restored with a minimum delay and a minimum requirement for labor.

Another important object of the invention is to improve the performance of a water cooler of the fountain type and the economy of operation thereof through the provision of a spill water precooler for the water supplied to the cooling coils, which spill water precooler shall be of a highly efficient construction.

A still further object of the invention is to provide an extremely compact but efficient water cooling unit which may advantageously be employed in the cabinets of the fountain type of water coolers which are particularly adapted for use as self supporting floor models, or mounted installations such as wall hung fountains or even for use in remote types of installations wherein the cooling unit is mounted remotely from the fountain component of the cooler.

A further important object of the invention is to provide a very compact type of cooling unit for water cooling fountains which shall admit of the use of either air cooled or water cooled condensers without substantial modification of or alteration of the remainder of the structure of the cooling unit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
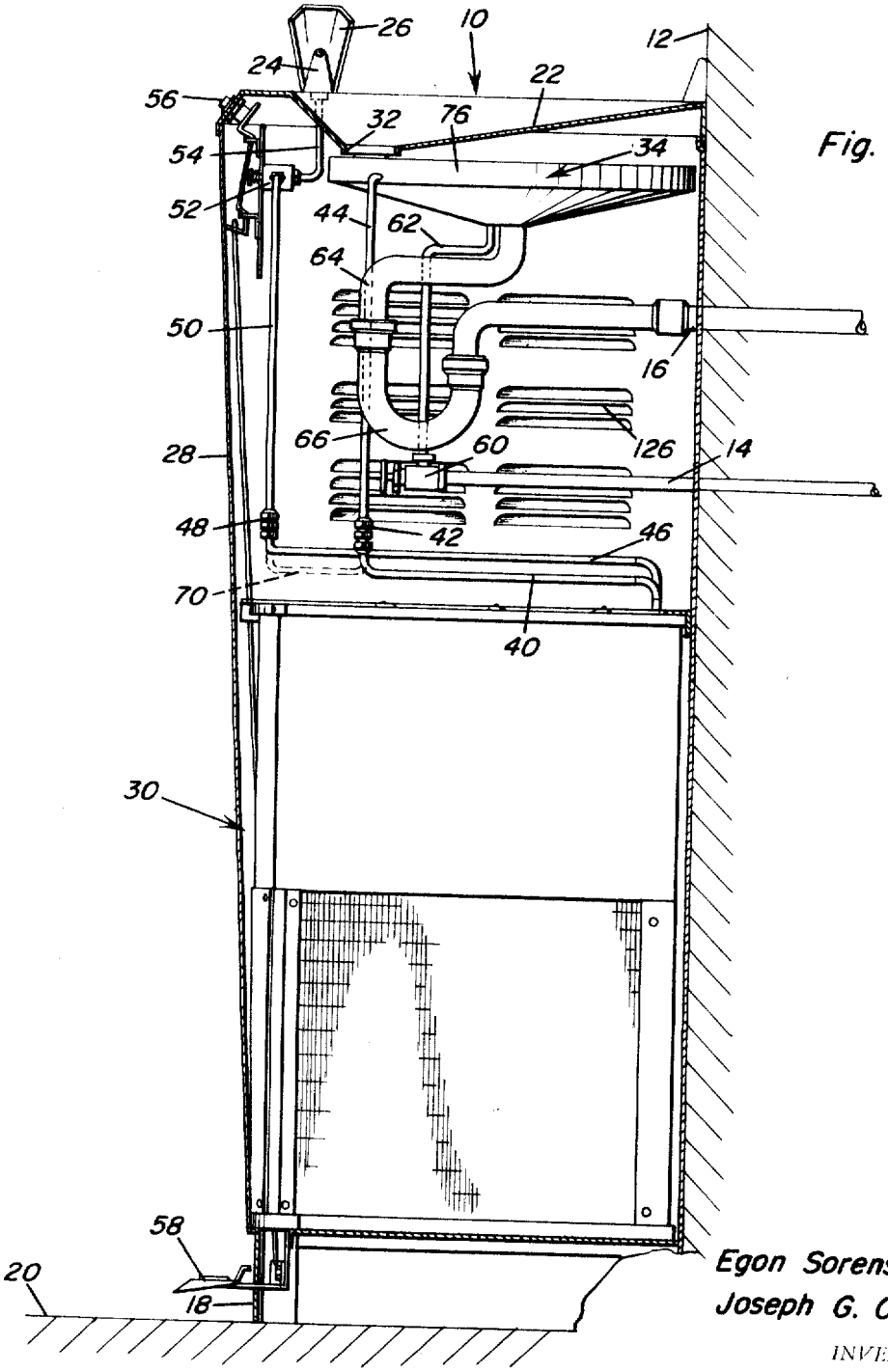
FIGURE 1 is a view in central vertical section through a floor model type of water cooler in accordance with this invention, parts being broken away and parts shown in elevation.
Figure 10:
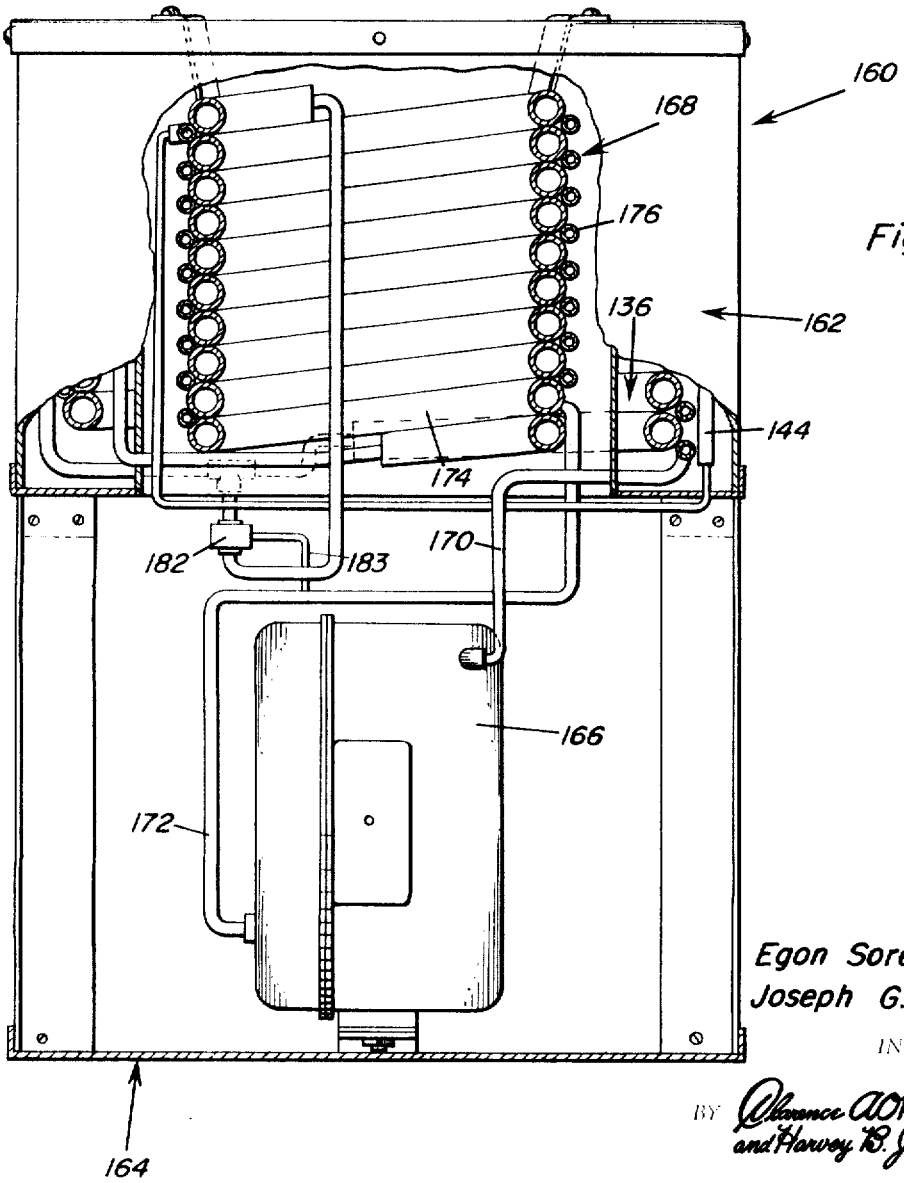
Figure 6:
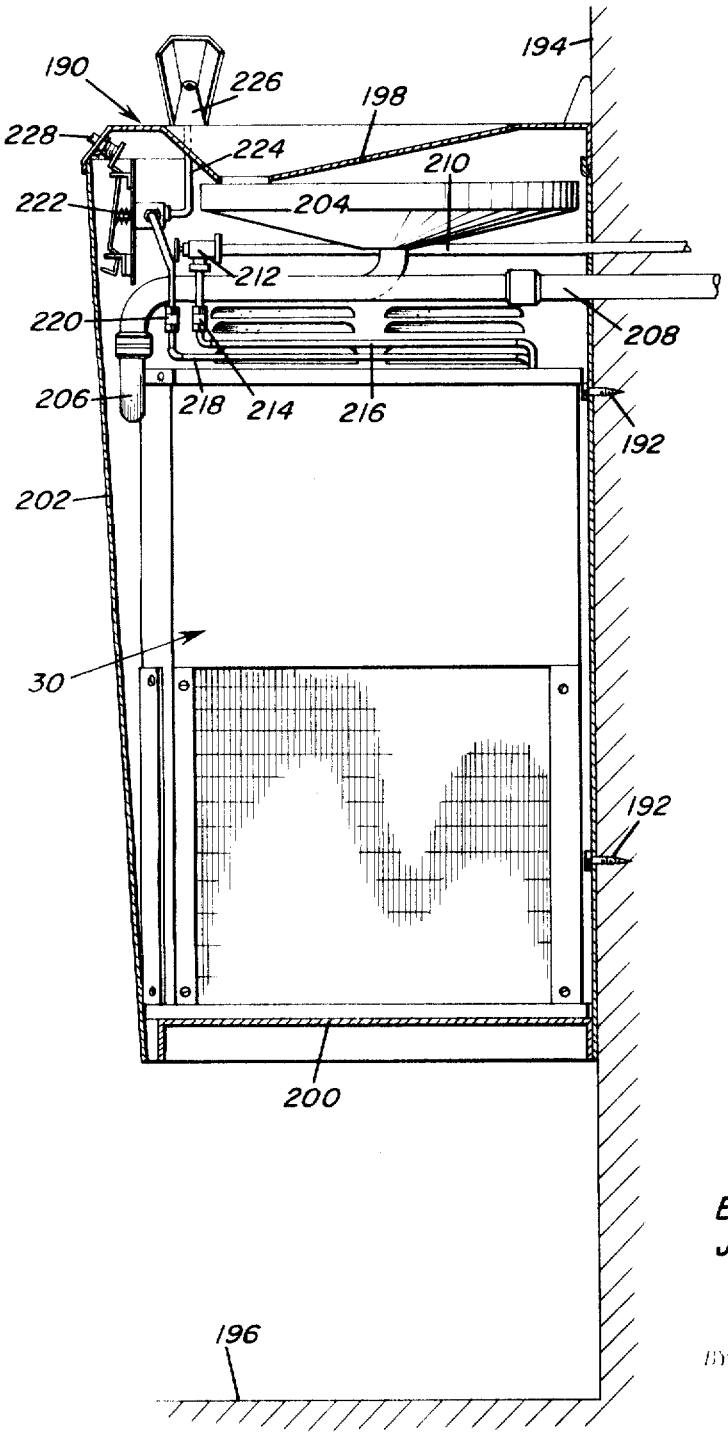
FIGURE 6 is a view in central vertical section through a modified construction of a fountain water cooler of the wall hung type and embodying therein the compact cooling unit in accordance with the invention such as the cooling unit of FIGURES 1–5.
Figure 7:
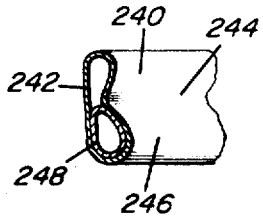
Figure 8:
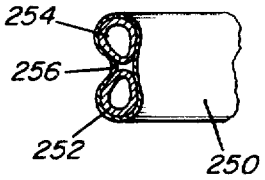
Figure 9:
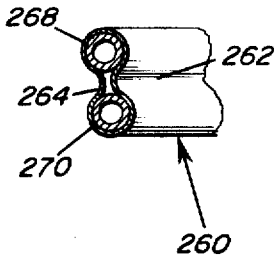

FIGURES 7–9 are detail views in perspective, of modified forms of the heat exchange coil constructions which may be employed in the spill water precooler of the fountain coolers of FIGURES 1 and 6 or in the condenser constructions of the cooling unit of the invention; and FIGURE 10 is a view partly in elevation and partly in vertical section of a modified construction of the cooling unit in accordance with the invention, wherein a water cooled condenser is employed in the cooling unit in lieu of the air cooled condensers of the preceding constructions.

There are numerous constructions of water cooler drinking fountains now available to the public. Such drinking fountains usually consist of an enclosing cabinet having the fountain spout extending thereabove, with the cabinet having the water cooler unit and its connections to the water supply and drain lines and to the spout of the fountain together with the suitable controls for the delivery of the water to the spout. The water cooler unit in such installations consists of a motor compressor unit for circulating a suitable refrigerant through a closed circuit and for establishing a heat exchange relation between the refrigerating coils of the unit and the cooling coils of the drinking water supply conduit.

However, when servicing of any of the components of the refrigerating unit or of the water cooling unit of such a fountain cooler is required, numerous difficulties usually arise. Since the servicing of the refrigerating compressor, or of the refrigerator circulating system requires the use of specialized factory equipment and of highly skilled personnel, frequently not instantaneously available at the location where service is required, either an undesirable and frequently long protracted delay occurs in effecting the necessary repairs and before the fountain can again be placed into operation or temporary or emergency repairs must be effected by relatively unskilled labor and inadequate equipment with a resultant uncertain or questionable performance of the drinking fountain. Further, if it develops that the inoperability of the drinking fountain is such as to require the removal of the water cooling unit from the cabinet, it has been heretofore necessary to remove the entire cabinet before the units or compartments requiring repair can be subsequently disassembled and removed therefrom; and there is further often a frequent complete stoppage of the use of the fountain until the cabinet can be removed, the faulty unit can be repaired and replaced or a replacement unit installed in the cabinet, and the cabinet be again returned and restored to use.

The basic purpose of the present invention is to overcome the above noted specific major disadvantages now attending the use of conventional drinking fountains and to provide an improved construction and very compact arrangement of a cooling unit consisting of a motor compressor unit for circulating a refrigerant in a closed circuit and which is incorporated into a unitary assembly with the water cooling portion of the unit having refrigerating coils through which the coolant is circulated and which is in a permanent heat exchange relation with *a portion of the water conducting system such as* the cooling coils *in the preferred forms of the invention* by which the water supply passes through the cooling unit and is delivered to the spout of the drinking fountain.

The compact cooling unit forming an essential portion of the subject matter of the present inveniton is specifically adapted for use in the cabinets of drinking fountains of the self-supporting floor model or of the wall hung type of drinking fountain although it may also be employed with efficiency in those types of installations in which the drinking spout of the installation is mounted remotely from but suitably connected to the cooling unit of the system.

Figure 2:
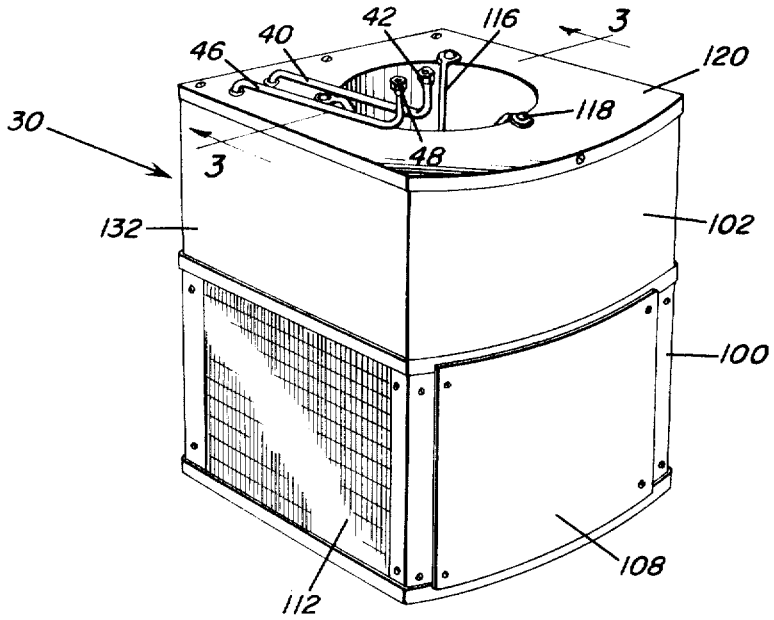
FIGURE 2 is a perspective view of the removable, compact cooling unit of the invention, being shown removed from the cabinet of FIGURE 1.
Figure 4:
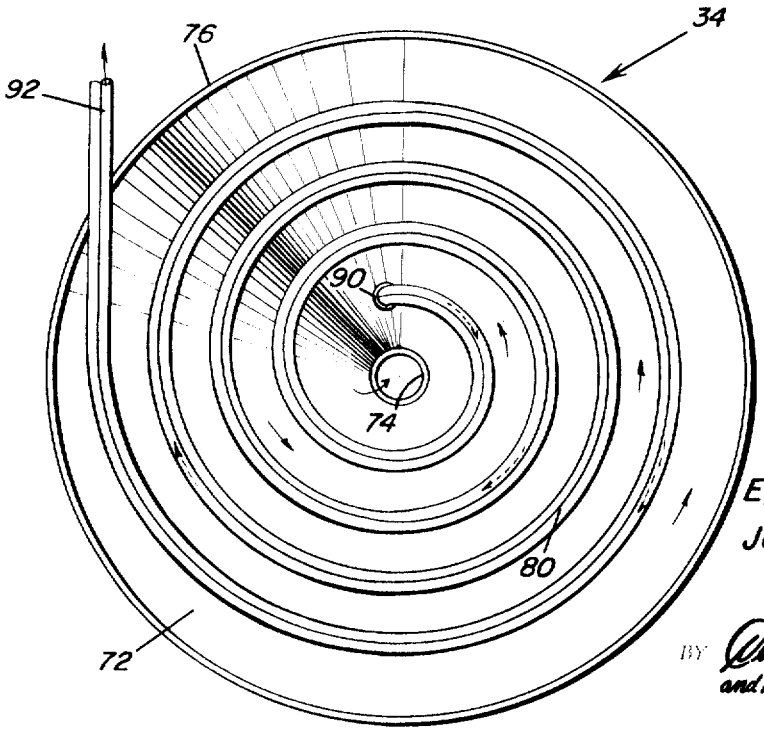
FIGURE 4 is a view in top plan and upon an enlarged scale of a form of spill water precooler forming a part of the cooling unit of the apparatus as shown in the preceding figures.
Figure 3:
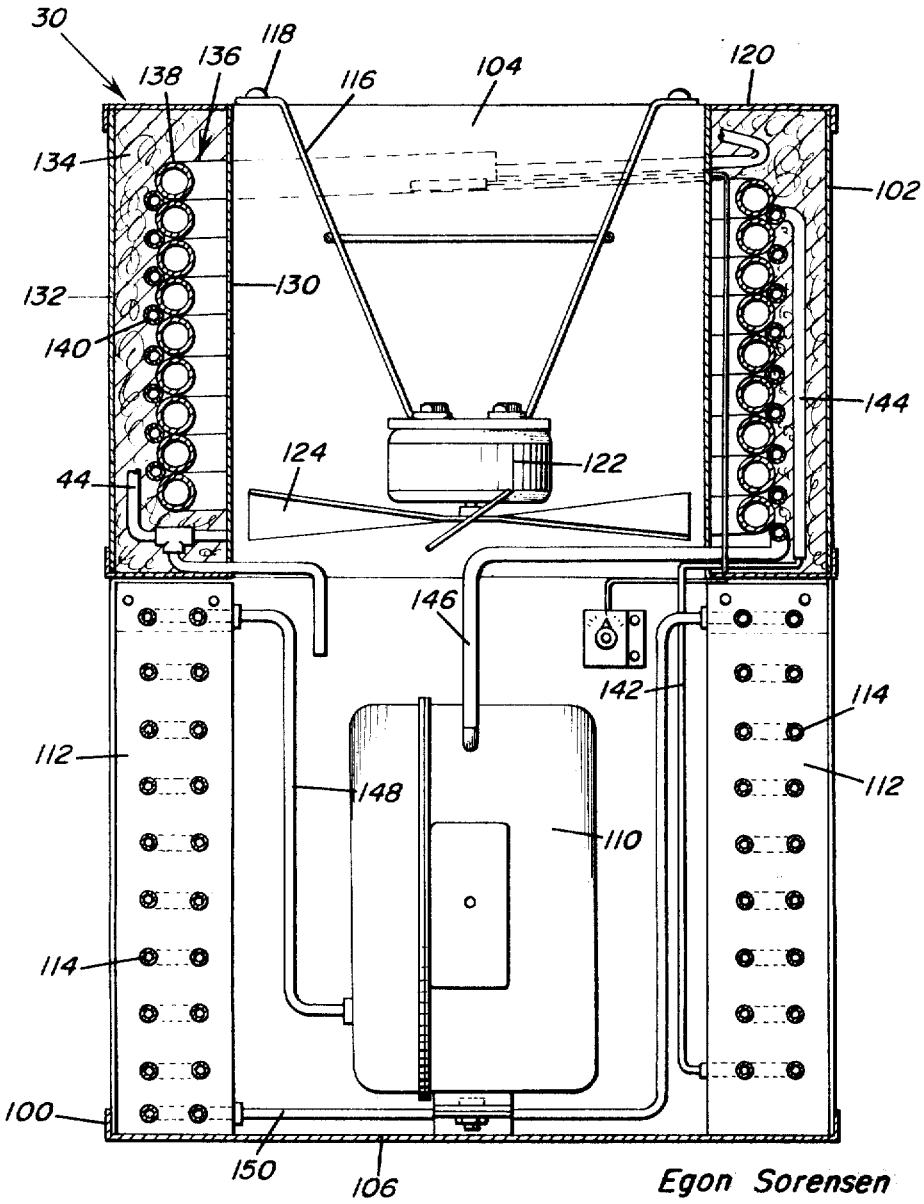
FIGURE 3 is a view in vertical transverse section through the cooling unit of FIGURE 2, being taken upon an enlarged scale substantially upon the plane indicated by the section line 3—3 of FIGURE 2, the cooling unit being of a type having a pair of air cooled condensers.
Figure 5:
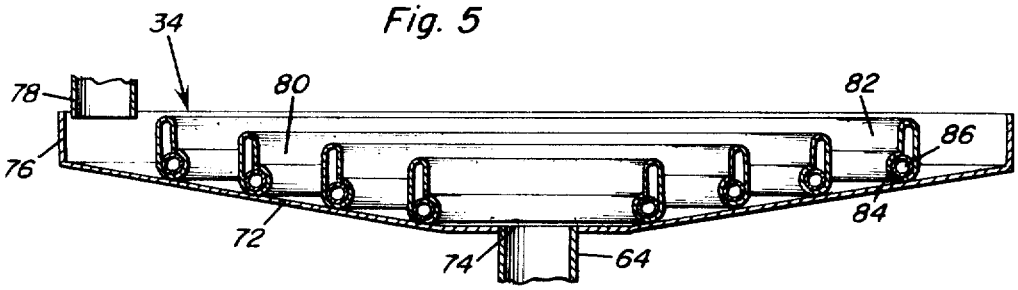
FIGURE 5 is a view in vertical transverse section of the spill water precooler of FIGURE 4.

The preferred manner of practicing the principles of this invention resides in the floor type construction of a drinking water fountain disclosed in FIGURES 1–5 and which incorporates therein the twin air condensers shown in FIGURE 3 together with the type of spill water precooler shown in FIGURE 5, which particular form of the invention will now be specifically described.

Floor Type Cooling Fountain of FIGURES 1–5

Referring first to FIGURE 1 it will be seen that the floor type of drinking fountain construction consists of a cabinet indicated generally by the numeral 10 and which is shown as being positioned against or adjacent a vertical wall 12 from which emerge the water supply pipe 14 and a water waste or drain pipe 16, the cabinet being shown mounted and supported by a suitable base as at 18 upon a floor or other supporting surface as at 20. The water drinking fountain of this type has the usual recessed basin 22 in its top surface from which rises a spout 24 for the discharge of the cooled or refrigerated drinking water and which spout is usually attended by a guard shield 26.

The cabinet 10 includes the usual removable wall panel or section of a wall as at 28 by means of which access may be had to the interior of the cabinet for the purpose of servicing the parts or removing therefrom the compact unitary cooling unit 30 of this invention, which unit is indicated in its entirety in FIGURE 2.

It will be observed that the cooling unit 30 is disposed in the lowermost portion of the cabinet, preferably resting upon the floor thereof and that the various connections between the water supply and drain conduits, the cooling unit and the spout 24 are all disposed in the upper portion of the cabinet above the cooling unit 30. There is also disposed in the upper portion of the cabinet and immediately below the recessed basin 22 and in communication with the discharge opening 32 of the latter a spill water cooling unit 34, which serves the dual functions of discharging the spill water from the spout 24 and collected by the basin 22 into the drain or return conduit 16, and in utilizing this spill water as a means for precooling the water supplied from the service line 14 into the cooling unit 30 and from the latter to the spout 24.

As will be observed especially from FIGURES 1 and 2, the cooling unit 30 is provided with a water inlet conduit 40 having a quickly detachable connector 42 by which it is connected to the conduit 44 by which precooled water is received from the spill water precooler 34 and is then delivered into the cooling coils of the cooling unit 30. A further conduit 46 provided with a quickly detachable connector 48 delivers the water refrigerated in the cooling unit 30 to a conduit 50 which in turn is connected to the control valve 52. The control valve is of conventional design and delivers the chilled or refrigerated water by a further conduit 54 to the fountain spout 24. The control valve 52 is suitably mounted upon the interior of the cabinet 10 and is operated selectively by a manual push button operating means as at 56 at the upper end of the cabinet or by a foot operated pedal 58 at the lower end thereof, suitable connecting means which in themselves form no part of the present invention being employed to operatively connect the manual and foot operators 56 and 58 to the valve 52.

As so far described it will now be understood that the general operation of this apparatus is as follows. Water from the service line is delivered by the supply conduit 14 and through a manual shut-off valve 60 to the inlet pipe 62 by which the water passes through the spill water precooler 34 to be hereinafter described as delivered by the conduit 34 and detachable connector 42 to the inlet line 40 of the cooling unit 30. From the latter the refrigerated water passes by the conduit 46, detachable connector 48 in conduit 50 to the valve 52 and thence to the conduit 54 to the spout 24. Spill water from the latter is collected in the basin 22, passes through the spill water unit 34, and by means of a drain conduit 64 detachably connected to a trap 66 is discharged to the drain or waste pipe 16.

It will be particularly noted that all of the connections with the water supply and drain conduits, and from the cooling unit for discharging water to the drinking fountain are housed [within the upper part of the same] where they are readily accessible for attachment or disconnection by removing the access panels 28.

Referring now specifically to FIGURE 1 it will be observed that there is shown in dotted lines a by-pass connecting conduit 70 which is shown as being capable of connection between the two ends of the conduits 44 and 50. The arrangement is such that when the cooling unit 30 is removed from the cabinet, for which purpose it is necessary to disassemble the connections 42 and 48, after first closing the manually operated supply valve 60, the conduit 70 may be connected to the connections 42 and 48 and thus directly connect the supply line, as it passes through the precooler by the conduit 62 to the spout whereby the fountain will be again placed into operation although the refrigerating of the water will no longer be achieved by this arrangement, and without the use of skilled labor the cooling unit 30 may be quickly disconnected from the other connections of the drinking fountain, removed therefrom and the drinking fountain may be again placed in operation although without the water cooling operation, in a relatively short period of time.

Reference is now made specifically to FIGURES 4 and 5 for an understanding of the construction and the operation of the spill water precooler 34. The spill water precooler 34 as illustrated comprises a circular metallic plate 72 which slopes radially downwardly from its perimeter to its central portion where it is provided with a drain opening 74 communicating with the attached portion of the drain conduit 64. The rim of the plate 72 has a circular upstanding wall 76 and adjacent this wall is the downwardly directed drain pipe 78 which depends from the previously mentioned drain opening 32 in the collecting basin 22. Thus, the spill water from the spout 24 which is discharged into and collects in the collecting or drainage basin 22 is drained through the drain pipe 78 into the spill water unit adjacent the peripheral wall thereof.

A spiral fin or wall 80 is disposed within the circular rim 76 and rises from and is secured to the plate 72 constituting the bottom wall of the spill water precooler. The spiral rib or fin 80 thus serves to direct the incoming spill water from the conduit 78 to follow a spiral path upon the top surface of the bottom wall 72 of the spill water unit before it reaches the discharge opening 74 and the discharge conduit 64. Consequently, the previously refrigerated spill water is caused to absorb heat from and thus to considerably chill the spiral fin 80 and refrigerate the latter before the spill water is discharged into the waste pipe 16.

The spiral rib 80 constitutes a heat exchange coil. As shown in FIGURE 5 in the heat exchange coil 80 consists of a vertically elongated outer metal tube 82 having a laterally enlarged lower portion 84 in which is received a metallic conduit 86. The conduit 86 has its opposite ends connected to the water supply conduit 62 by which water from the service line 14 is delivered to the spill water precooler and to the discharge conduit 44 whereby the precooled water is in turn delivered from the spill water precooler to the conduit 40 by which it is inducted into the cooling unit 30. As will be noted from FIGURE 4, the inlet end of the heat exchange coil 80 passes through an aperture 90 which is positioned closely adjacent to the opening 74 at the central portion of the bottom wall plate 72 of the precooler unit and is sealed in this opening in a water-tight relation in any suitable manner. The other end of the water precooling coil 80, as shown at 92 in FIGURE 4 passes outwardly of the spill water precooler unit and preferably through the side wall 76 thereof as shown in FIGURE 1 and forms a part of or is connected to and is in communication with the precooled water delivery conduit 44 previously mentioned.

It will thus be observed that the spill water precooling coil 80 establishes a good heat exchange relation between the spill water and the supply water for the cooling unit and the fountain and maintains two thicknesses of metallic conduits between the feed water and the cooling water. The spill water cooler further possesses the important advantage that it is vertically a very compact unit having a minimum over-all height while causing a horizontal travel of the cooling water to provide a relatively great area for heat exchange purposes. Thus optimum use is made of the relatively limited vertical space available within the cabinet 10, but utilizes to the fullest the considerable horizontal area which is present therein.

It will be understood at this point that the specific arrangement of the feed water conduit 86 and of the spill water cooling conduit 82 previously described in connection with the spill water precooler construction, although a preferred embodiment for the purposes of this invention could be replaced by other arrangements by which the desired heat exchange relation is established between the feed water and the cooling water. For example, the alternative precooler coil construction of FIGURES 7–9, to be described hereinafter more specifically, can be utilized in the arrangement of FIGURES 4 and 5 with the same spiral disposition of the cooling coil 80 within the basin of the precooler unit.

Attention is now directed more specifically to FIGURE 3 for an understanding of the construction and the relative arrangement of the components of the cooler unit 30. The cooling unit 30 consists of a lower section 100 in which is housed the motor, compressor and condenser components of the cooling unit and an upper section 102 in which is disposed the evaporator or chilling component of the cooling unit, the two sections being preferably separately constructed and then rigidly secured together into a unitary assemblage. As will be observed from FIGURE 3, there is a vertically disposed centrally positioned air passage 104 extending through these units, this passage being open at the top of the section 102, but being closed at the bottom of the section 100 as by the bottom wall 106 of the latter.

The lower section 100 has a removable access closure 108 in one side wall of the latter whereby access may be had to the interior of the lower section for inspection of or servicing of the motor compressor unit 110 mounted therein, and which latter is of any conventional design. A pair of air condensers 112 are mounted in opposite side walls of the lower section and likewise are of any suitable and well known design. These air condensers are so disposed that cooling air entering the cooling unit from the open upper end of the passageway 104 will pass downwardly through the upper section 102, the lower section 100 and will emerge through the air condensers 112 thereby cooling the refrigerant circulating coils 114 therein.

Referring now more specifically to the upper section 102 it will be observed that by a spider type of support assembly 116, secured by fastening bolts 118 to the top closure plate 120 of the top section 102, there is supported centrally within the passageway 104 an electric motor 122 provided with a cooling fan 124. The cooling fan is thus disposed within the passageway at the lower portion of the upper section 102 and just above the upper portion of the lower section 100. The fan assists in directing a flow of cooling air in a direction indicated by the arrows in FIGURE 3 downwardly through the passageway 104, over and about the motor compressor unit 110 and then laterally outwardly through the two air condensers 112 where this air is discharged through suitable louvers in the sides of the cabinet 10 closely adjacent to the floor upon which the cabinet stands. The air supplied to the upper end of the passageway 104 is preferably drawn into the louvers 126, see FIGURE 1, in the sides of the cabinet 10, where the incoming air will be drawn across the exposed portions of the water piping system therein and will serve to remove condensation therefrom and prevent the dripping of condensate.

The upper section 102 has a cylindrical sleeve 130 which forms the wall of the pasageway 104 in the upper section, and the space between the sleeve 130 and the outside casing 132 of the upper section is filled with suitable heat insulating material 134 of any desired character in which is embedded a refrigerating coil assembly forming the evaporator of the cooling unit and which is indicated generally by the numeral 136. The refrigerating coil 136 consists of two nested coils 138 and 140 which are secured together in an intimate heat exchange relation.

The evaporator unit 136 is of a conventional type and is connected to the motor compressor unit in accordance with conventional closed cycle refrigerating systems.

In operation, the refrigerant which is liquefied by passage of the same through the coil 114 in the air condensers 112 is conducted by the liquid refrigerant supply or delivery conduit 142 to the expansion chamber portion of the refrigerating system as at 144, and from thence passes through the refrigerating coolant coil 140, and from thence is returned by the conduit 146 into the motor compressor unit [140]. From the latter the compressed refrigerant is then delivered by the conduit 148 into one condenser 112 at the upper end thereof, passes through the cooling condenser coils 114, is then discharged by the conduit 150 to the upper end of the other air condenser unit where it is liquefied and then again starts it cycle by passage through the delivery conduit 142. The usual suitable controls are provided whereby the operation of the refrigerating cycle of the coolant and of the motor compressor unit is automatically effected.

By means of the conduit 44 the precooled water supply from the spill water precooler is delivered to the water cooling coil [140] *138* in the evaporator portion of the upper section 102, and passing through the coil [140] *138* in good heat exchange relation with the [refrigerating] *refrigerant* coil [138] *140* is chilled and then delivered by the conduit 46 to the spout 24.

It will be observed that in this construction there is a forced downflow of cooling air through the center of the apparatus the air being drawn into the cabinet at the upper or midportion of the same and being discharged therefrom adjacent the floor upon which the cabinet rests, and serving to cool the motor compressor unit as well as to constitute the cooling medium for the condenser 112.

In this construction air cooling condensers 112 are employed in order to obtain the advantage of water economy in the apparatus. In some instances, however, it may be preferred to utilize the greater cooling capacity of water cooler condenser and for this purpose the modified construction shown in FIGURE 10 and to be hereinafter described may be satisfactorily employed.

Water Cooled Condenser Construction of FIGURE 10

Although the air cooled condenser construction of the embodiment of FIGURES 1–5 is considered to be the preferred form of practicing the principles of this invention, it is also possible to utilize therein a water cooled condenser construction in place of the air cooled condensers in the embodiments of FIGURES 1–5, or also the embodiment of FIGURE 6 or in the previously referred to installations in which the drinking fountain is located remotely from the water refrigerating unit which is connected thereto.

In the embodiment illustrated in FIGURE 10 the numeral 160 identifies the cooling unit corresponding to the unit 30 previously mentioned. In the cooling unit 160 there is likewise provided an upper section 162 which is identical with the section 102 of the unit 30, and a lower section 164 which is of the modified construction disclosed in FIGURE 10. The two sections are joined together rigidly as in the preceding embodiment and their association with the cabinet 10 and the other elements of the drinking fountain installation are identical with that previously described.

Moreover, in the arrangement of FIGURE 10 the lower section 164 has the motor compressor unit 166 therein likewise mounted centrally of the unit as in the preceding embodiment. The water condenser unit 168 is now mounted however in the upper section within the central space inside the evaporating unit 136, the fan 124 and motor 122 being now removed. The refrigerant inlet line to the motor compressor unit is shown by the numeral 170, while the output line therefrom to the condenser is indicated at 172.

The water condenser 168 consists of two nested coils, there being the cooling water coil 174 and the coolant or refrigeration coil 176, these coils being secured together in an intimate heat exchange relation. The conduit 172 is connected to the coil 176 while the liquid refrigerant from the latter is discharged by the conduit 180 into the evaporating chamber 144 of the evaporator and refrigerating coil unit 136 of the construction previously mentioned in connection with the preceding embodiment.

The automatic control valve 182 is disposed within the lower section 164 to control the supply of cooling water to the water cooling coil 174 of the water condenser 168. A capillary line 183, communicating with the high pressure side of the refrigeration system, as for example to 172, serves to operate water regulating valve 182 to admit additional cooling water, when needed, in response to increased pressure above a predetermined value.

In this arrangement, cooling water supplied by the control valve 182 passes through the water cooling coil 174, it is then discharged from the latter to any suitable drain and in any desired manner, not shown. In some instances, the forced air circulation provided by the fan 124 and the cooling air passage 104 of the preceding embodiment may be employed to supplement the action of the water cooling of the condenser and/or to cool the motor compressor unit 166. In other instances, however, the cooling air circulation may be in part or completely dispensed with.

The structure of this form of the invention permits the use of the same base and mounting of the motor compressor in the lower compartment, as in the preceding form, while the air fan and motor is replaced by a water cooled condenser unit mounted in the space formerly occupied by the former. The air condenser units of FIGURES 1–5 are of course dispensed with in this arrangement.

Wall-Hung Type Drinking Fountain of FIGURE 6

Referring next to FIGURE 6 it will be observed that there is disclosed a wall hung type of cabinet 190 of a drinking fountain which is of a more compact and of a smaller volume than that of the floor type installation previously described. In this arrangement the cabinet 110 is secured as by fastening screws 192 to the vertical surface of the wall or other support 194 in a convenient position for use and above a floor or the like as at 196. The cabinet likewise includes a top wall having a recessed collection basin 198 therein, the supporting bottom wall 200 and a removable wall or closure panel 202 by which access may be had to the interior of the cabinet for the same purposes as set forth in connection with the embodiment of FIGURES 1–5. There is likewise mounted at the lower portion of this cabinet the cooling unit 30 of the cabinet previously described. In this embodiment it will be observed that the cooling unit takes up most of the volume of the cabinet 190, whereas in the embodiment of FIGURES 1–5 the cooling unit requires a relatively smaller proportion of the volumetric space within the cabinet. The spill water cooler 34 previously mentioned is also employed, and the same reference numerals are applied thereto. The drain 204 in the discharge opening in the bottom of the collection basin 198 is connected through the trap 206 directly with the waste pipe 208 extending from the wall into the interior of the cabinet. Further, the water inlet line 210, controlled by a manual cut-off valve 212, is connected through a suitable detachable connection 214 with the inlet line 216 by which the incoming water is delivered into the cooling unit 30. Through the conduit 218, the refrigerated water is discharged from the cooling unit 30 through a detachable coupling 220 to the manual control valve 222 from which it is delivered by supply conduit 224 to the fountain spout 226 in the same manner as in the preceding embodiment. The push button as at 228 serves as a manually operated means to control the operation of the valve 222, it being observed that the pedal operated valve 58 of the embodiment of FIGURES 1–5 is being omitted as being no longer required for this form of the invention.

However, as in the preceding form of the invention when it is necessary to move the cooling unit 30 from the cabinet 190, the connections 214 and 220 may be quickly broken so that the cooling unit may be readily removed, then a branch conduit similar to the conduit 70 of FIGURE 1 may then be connected to the connections 214 and 220 to again place the spout 226 of the fountain in operation even though the cooling unit has been removed therefrom.

Modified Heat Exchange Coils of FIGURES 7–9

As previously mentioned, the heat exchange coil 80 of the embodiment of FIGURES 1–5 can be replaced with the modified heat exchange coils of FIGURES 7–9. Further, these modified heat exchange coils can also be used as can the type of coil 80 of FIGURES 4 and 5 in place of the heat exchange coils 136 of the evaporator unit in the embodiments of FIGURES 1–5 and FIGURE 10.

In each of FIGURES 7–9, there is disclosed a heat exchange coil system in which the coil containing the liquid to be cooled is in return received in a second metallic tube to thus ensure against the possibility of a leak developing between the feed water and the spill water which would contaminate the feed water.

In the arrangement of FIGURE 7 the flattened outside metallic tube indicated at 240 has one relatively flat side wall 242, while the other side wall thereof is inwardly deformed as at 244 to provide a lower tubular portion 246 in which is received and enclosed the water tube 248. It will be observed that in this arrangement the deformed wall also to some extent deforms the water tube 248 so that the latter is almost completely enveloped by the flat wall 242 and the curved wall 246 thereby obtaining an almost complete envelopment of the tube 248 to secure a maximum area of contact and heat exchange relation between the outside tubular member 240 and the inside tube 248. Comparing FIGURE 7 with the arrangement of FIGURE 5 it will be observed that a greatly increased area of contact and heat exchange is produced by the construction of FIGURE 7 as compared with that of FIGURE 5.

Referring next to FIGURE 8 it will be observed that the outside tube 250 has a pair of tubes 252 and 254 therein, the former of which can receive the water to be cooled while the latter can receive the cooling medium being circulated. A deformation 256 of one of the walls of the outer tube serves to separate the tubes 252 and 254, increase the rate of heat exchange contact between the outer and inner tubes.

In the arrangement of FIGURE 9, the outer tube 260 has both of its side walls inwardly deformed as at 262 and 264 to thereby embrace and separate the two inner tubes 268 and 270.

In all of these forms of the invention it will be observed that the deformation of the outer tube increases the area of contact in heat exchange relation between the latter and the inner tube or tubes, further protects the inner tube against the danger of a puncture whereby the feed water supply might be contaminated by the coolant.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A drinking fountain including a cabinet having a water spout projecting therefrom, a water supply line entering said cabinet and a water drain line emerging therefrom, drain means in said cabinet for collecting spill water from said spout and delivering it to said drain [lines] line, a cooling unit mounted in said cabinet for ready removability, water inlet means in said cabinet for delivering water from said supply line to said cooling unit and water delivery means in said cabinet for delivering cooled water from said cooling unit to said spout, said delivery means including a manually operated control valve, quick detachable connections between said cooling unit and each of said water inlet and water delivery means, said quick detachable connections being located in said cabinet [above said cooling unit] and by-pass means connectible between said water inlet and delivery means for connecting said water inlet means to said spout when said cooling unit is disconnected therefrom.

2. A drinking fountain including a cabinet having a water spout projecting therefrom, a water supply line entering said cabinet and a water drain line emerging therefrom, drain means in said cabinet for collecting spill water from said spout and delivering it to said drain lines, a cooling unit mounted in said cabinet for ready removability, water inlet means in said cabinet for delivering water from said supply line to said cooling unit and water delivery means in said cabinet for delivering cooled water from said cooling unit to said spout, said delivery means including a manually operated control valve, said cooling unit comprising a housing having upper and lower unitary sections rigidly connected together, said housing containing a circulating closed circuit refrigerating system therein including a refrigerating coil and a water cooling coil in good heat exchange relation, said lower section containing a motor compressor unit and condenser means comprising components of said refrigeration system, said upper unit containing said refrigerating and said water cooling coils, a cooling air passage extending centrally through said unit for delivering cooling air to said motor compressor unit.

3. The combination of claim 2 including a fan mounted in said air passage above said lower section for forcing cooling air into said lower section.

4. The combination of claim 3 wherein said condenser means includes at least one condenser unit disposed in said lower section and communicating with said air passage and opening through a side of said cabinet.

5. The combination of claim 4 wherein said condenser means comprises a pair of condenser units in said lower unit on opposite sides of said motor compressor unit and each communicating with said air passage and opening through a side of said cabinet.

6. A replaceable cooling unit for use with drinking water fountains comprising a housing having a chamber in its lower portion and a central air passage through its upper portion and communicating with said chamber, a closed circuit circulating refrigerating system including a motor compressor in said housing and including an evaporator refrigerating unit in said upper portion surrounding said air passage and connected to said motor compressor, condenser means disposed in said chamber, conduit means in heat exchange relation to said evaporator for material to be cooled, means associated with said air passage delivering cooling air to said motor compressor and to said condenser means.

7. The combination of claim 6 wherein said condenser means comprises a pair of air cooled condensers disposed on opposite sides of said motor compressor means and each exposed to the atmosphere through a side of said housing.

8. The combination of claim 6 wherein said cooling air delivery means comprises a support structure mounted upon said housing and projecting into said air passage and a cooling fan in said air passage mounted upon said support structure.

9. A drinking fountain including a cabinet having a water spout projecting therefrom, a water supply line entering said cabinet and a water drain line emerging therefrom, drain means in said cabinet for collecting spill water from said spout and delivering it to said drain line, said cabinet having an access opening and closure means for said opening, a cooling unit disposed in said cabinet for passage through said access opening, support means in said cabinet for supporting said cooling unit adjacent said access opening for ready removability of said cooling unit therethrough, water inlet means in said cabinet for delivering water from said supply line to said cooling unit and water delivery means in said cabinet for delivering cooled water from said cooling unit to said spout, said delivery means including a manually operated control valve, a quick detachable connection between said cooling unit and each of said water inlet and water delivery means, said quick detachable connection being located in said cabinet adjacent said cooling unit and by-pass means connectible between said water inlet and delivery means for connecting said water inlet means to said spout when said cooling unit is disconnected therefrom.

*10. A drinking fountain including a cabinet, a water supply line entering said cabinet, a water spout, a water drain line, drain means for collecting spill water from said spout and delivering same to said drain line, a refrigeration unit mounted in said cabinet for ready removability, water inlet means in said cabinet for delivering water from said supply line to said refrigeration unit, water delivery means for delivering cooled water from said refrigeration unit to said spout, said delivery means including a manually operated control valve, quick detachable connections being located in said cabinet for connecting said refrigeration unit between said inlet and delivery means, and by-pass means connectible by said connections between said water inlet and delivery means for connecting said water inlet means to the spout when said refrigeration unit is disconnected therefrom.*

*11. In combination with a fresh water pipe and a waste water drain pipe, a water cooler comprising, a cabinet having an access opening and closure means for said opening, said fresh water pipe and said drain pipe extending into the cabinet and terminating interiorly thereof, a water conducting system carried by said cabinet comprising cooled water conveying means having an inlet disposed interiorly of the cabinet and an outlet dis-*

*posed exteriorly of said cabinet, drain means mounted by said cabinet for collecting spill water from the outlet and delivering same to the waste water drain pipe and a fresh water conduit disposed within the cabinet for connection to said fresh water pipe, a refrigeration unit including a heat exchange portion of said fresh water conduit, said unit being disposed within said cabinet and being movable into and out of said cabinet through said access opening, and a pair of readily disconnectible means connecting the inlet of said cooled water conveying means to the heat exchange portion of the fresh water conduit, said readily disconnected means, when disconnected, permitting said refrigeration unit to be removed from said cabinet without removal of the cooled water conveying means and the drain means.*

*12. In combination with a fresh water pipe and a waste water drain pipe, a water cooler comprising, a cabinet having an access opening and closure means for said opening, said fresh water pipe and said drain pipe extending into the cabinet and terminating interiorly thereof, a cooling unit including a water conducting means for water to be cooled having an inlet and an outlet, said unit being disposed within said cabinet and being movable into and out of said cabinet through said access opening, cooled water conveying means having an inlet disposed interiorly of the cabinet and an outlet disposed exteriorly of said cabinet, drain means mounted by said cabinet for collecting spill water from the outlet and delivering same to the waste water drain pipe and a fresh water conduit disposed within said cabinet for connecting said fresh water pipe to said water conducting means, and readily disconnectible means connecting the inlet of said water conveying means to the outlet of said water conducting means and said fresh water conduit to the inlet of the water conducting means, said readily disconnectible means, when disconnected, permitting said cooling unit to be removed from said cabinet without removal of the cooled water conveying means, drain means and fresh water conduit.*

*13. The combination of claim 12 wherein the cooling unit further includes a refrigerant conducting evaporating coil in permanent heat exchange relation to the water conducting means.*

References Cited by the Examiner

The following references, cited by the Examiner, are of record in the patented file of this patent or the original patent.

UNITED STATES PATENTS

| | | | |
|---|---|---|---|
| 1,912,572 | 6/1933 | Ebinger | 62—391 |
| 2,010,504 | 8/1935 | Askin | 62—395 |
| 2,186,900 | 1/1940 | Dick et al. | 62—395 |
| 2,276,964 | 3/1942 | Grove | 62—391 |
| 2,446,289 | 8/1948 | Love | 62—391 |
| 2,481,662 | 9/1949 | Hastings | 64—391 |
| 2,518,299 | 8/1950 | Ferhandez | 62—299 |
| 2,600,474 | 6/1952 | Brunstad | 62—343 |
| 2,667,039 | 1/1954 | Wehrwein | 62—214 |
| 2,674,106 | 4/1954 | Hill | 62—391 |
| 2,725,725 | 12/1955 | Materese et al. | 62—392 |
| 2,750,756 | 6/1956 | Canter | 62—393 |
| 2,865,182 | 12/1958 | Schultz | 62—298 |

MEYER PERLIN, *Primary Examiner.*